United States Patent [19]
Ver Sluis

[11] 3,801,779
[45] Apr. 2, 1974

[54] SNOWFALL LEVEL DETECTOR

[76] Inventor: David G. Ver Sluis, 8897 Vergennes, S.E., Ada, Mich. 49301

[22] Filed: May 3, 1972

[21] Appl. No.: 249,826

[52] U.S. Cl............ 250/222 R, 73/170, 250/237 R
[51] Int. Cl........................................G06b 7/00
[58] Field of Search.......... 250/83.3 D, 43.5 D, 221, 250/222, 237; 62/137; 73/149, 171, 170

[56] References Cited
UNITED STATES PATENTS

| | | | |
|---|---|---|---|
| 2,476,217 | 7/1949 | Pond | 250/222 |
| 2,118,651 | 5/1938 | Macchi | 250/223 |
| 3,091,368 | 5/1963 | Harley | 250/223 |
| 3,665,180 | 5/1972 | Guillot | 250/83.3 D |
| 3,589,813 | 6/1971 | Sturzinger | 73/171 |

*Primary Examiner*—James W. Lawrence
*Assistant Examiner*—D. C. Nelms
*Attorney, Agent, or Firm*—Price, Heneveld, Huizenga & Cooper

[57] ABSTRACT

Apparatus for detecting the occurrence of an amount of snowfall, or of drifting snow, above a predetermined level and providing a signal at a remote location. A light source, a light sensor, and a plurality of apertured baffle members are mounted on a base plate. The light source is arranged to project a beam of light through the apertures in the baffle members at a predetermined distance above the base plate for detection by the sensor. Upon interruption of the light beam by accumulated snow a signal is produced to activate an alarm or the like to thereby indicate that a predetermined level of snowfall or drifted snow has occurred.

14 Claims, 3 Drawing Figures

PATENTED APR 2 1974          3,801,779

SNOWFALL LEVEL DETECTOR

BACKGROUND OF THE INVENTION

In the past, a number of different types of snowfall detection devices have been conceived to detect the presence or the amount and level of snowfall. One such prior art device, illustrated in U.S. Pat. No. 3,141,330, discloses a precipitation monitoring device utilizing photocells to monitor the reflectivity of the snowfall to indicate the density of the fall. The actual amount of snowfall is detected by the snow falling on a tuning fork and thereby changing its fundamental frequency. Another method of detecting accumulated precipitation is illustrated in U.S. Pat. 2,717,957 wherein a heater element melts the snow and the resultant liquid level is measured.

Detection of snowfall is useful for many reasons. A primary application to which most individuals are familiar is for the daily reports issued by the United States Government National Weather Service. Another group of individuals who are extremely concerned with the amount of snowfall are those charged with responsibility for snow removal from streets and highways, as well as the many service companies who make a business of removing snow from driveways, sidewalks, parking lots, and the like on a contract basis. Business places subscribing to such services usually contract with a snow removal service company to maintain their premises in essen-tially snow-free condition. One of the requirements generally is that the walks, drives and parking lots be cleared prior to the time that employees or other individuals arrive at the business place. This requires that the snow removal operator constantly watch the level of accumulated snow so that when it accumulates above a predetermined negligible level he can promptly get his equipment into operation. If snowfall occurs during the night, as is often the case, the operator must awake and get up several times during the night to check the level of the snow so that excessive amounts are not allowed to accumulate. As is well known, snow plowing is often an all-night or even around-the-clock job during the several winter months in many parts of the country, when shownfalls are steady and sizeable, particularly during large storms. This is a severe physical drain on the human operators, who need all the rest they can get during such times. For this reason it is particularly desirable for such persons to have snowfall detection equipment which will with complete reliability generate a signal or other indication after a predetermined amount of snow has accumulated. In addition, the typical winds associated with winter weather can often cause drifting and blowing of snow which has previously fallen, causing it to drift into the cleared areas and requiring plowing even though no new snowfall has occurred during that period.

The above-described prior art devices are rather complex in their operation and are very expensive, particularly the first such device, being well out of the economic reach of the average small business snow plow operator. In addition, these devices have no facility for detecting drifting snow but rather only measure the amount falling directly downwardly. Furthermore, devices of the type which melt the snow and measure the liquid equivalent are subject to freezing and, as a consequence, unreliable operation. It is therefore desirable to provide a snowfall detection apparatus which is relatively inexpensive, simple in operation, extremely reliable, and which in addition can detect drifted snow.

SUMMARY OF THE INVENTION

The present invention relates to a snowfall detection device and more particularly to a detection device which is relatively simple in construction and is uniquely adapted to provide a signal when the fallen snow has reached a predetermined level. The apparatus is adapted to detect not only the level of direct precipitation but is also equipped to detect and provide a signal when an amount of drifting snow exceeds a predetermined level.

The snowfall detection apparatus of the present invention includes a light source, a light sensor and a plurality of apertured baffle members mounted on a base plate. The light source is arranged to project a beam of light through the apertures in the baffle members at a predetermined distance above the level of the base plate for detection by the sensor. Snow accumulating on the base plate and held by the baffles about the areas of the apertures interrupts the light beam, triggering a signal to produce an audible alarm or other indication to the operator.

It is therefore a primary object of the present invention to provide an apparatus for the detection of snowfall above a predetermined level.

It is another object of the present invention to provide a snowfall detection apparatus which is simple in construction, relatively inexpensive to manufacture and which operates with complete reliability.

It is an additional object of the present invention to provide a snowfall detecting apparatus which is uniquely adapted to detect drifting snow over a predetermined level.

Other important features, objects and advantages of the invention will be readily understood by those skilled in the art upon reading the following description with reference to the accompanying drawings illustrating a preferred embodiment of the invention.

DESCRIPTION OF THE PREFERRED EMBODIMENT

Figure 1:
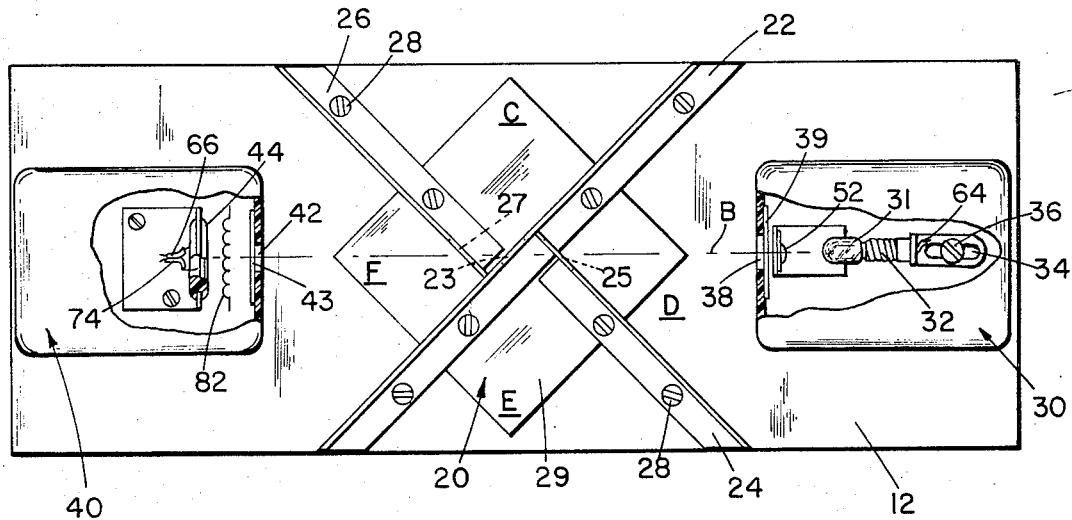
FIG. 1 is a top plan view of the snow-detecting apparatus of the invention.
Figure 2:
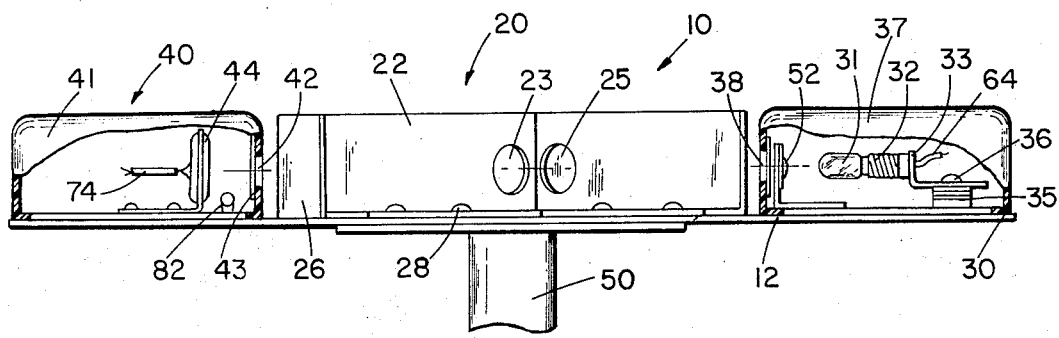
FIG. 2 is a side view, partially in section, of the apparatus of FIG. 1.

Referring now to FIGS. 1 and 2 of the drawings the snowfall apparatus of the present invention will be described in detail. The apparatus is illustrated generally by the numeral 10 and is divided into three basic sections: the snow accumulator section 20, a light beam transmitter 30, and a light beam receiver 40 cooperatively arranged on an elongated rectangular mounting or base plate 12.

The accumulator section 20 is located in the approximate center of the mounting plate 12 and includes a plurality of diagonally positioned elongated barrier members which may be angle stock of L-shaped cross section. As shown in FIG. 1 a first elongated barrier member 22 extends diagonally across the mounting plate 12 from the lower left hand portion to the upper right hand portion. The barrier member 22 has an opening 23 (FIG. 2) therein at its central portion and in alignment with the approximate centerline of the mounting base 12. A second barrier member 24 having an opening 25 therein is positioned in abutment against (or very close to) the first barrier member and extends perpendicular thereto, toward the lower right of the base plate 12. The opening 25 is similarly positioned in alignment with the approximate centerline of the base plate 12. A third barrier member 26 similar in construction to the second barrier member 24 is also positioned in end abutment or closely adjacent, and perpendicular to, the first barrier member 24 and extends toward the upper left of the base plate. An opening 27 provided in the third barrier member is also positioned in substantial alignment with the approximate centerline of the base plate.

The presence and to a certain extent the relative position of the barrier members with respect to each other is an important feature of the present invention. It should be noted that barrier members 24 and 26 extend perpendicular to barrier member 24 in opposite directions and do not intersect or lie in alignment with each other at their point of intersection with barrier member 22, but instead have their axes spaced a slight distance apart. This particular feature further contributes to the utility of the invention with respect to the detection of drifting snow as will be more fully described hereinafter.

The barrier members 22, 24 and 26 may be fixed to the base plate 12 in any desired manner, as by suitable screws or like fastening means 28 passing through the lower leg of each of the L-shaped barrier members and threadably relieved in the base plate. A section of insulating material 29 may be positioned below the barrier members on the plate 12, in an area generally about the apertures 23, 25 and 27. The insulating material preferably is a fibrous material such as polymeric carpeting and serve to prevent the snow falling thereon from melting upon contact with the base member 12. This would occur if, for example, the apparatus were exposed to sunlight thereby warming the base material such that it might still contain an amount of residual heat to melt the new fallen snow.

The transmitter 30 is adapted to project a light beam B along the elongated axis of the base plate 12, through the openings 23, 25 and 27, to the sensor 40. Transmitter 30 includes a light source, which may be a conventional bulb 31 mounted in a conventional socket 32. The socket is fixed in an L-shaped bracket 33. The bracket is provided with an elongated slot 34 at its extending leg portion. A plurality of adjustment washers 35 are positioned below the bracket 33 on the base panel 12. A screw and lock washer 36 passing through the elongated slot in the bracket through the washers 35 secures the bracket to the base member 12. The screw may be loosened and the bracket moved along the elongated slot and washers may be removed or added to adjust the position of the light source both horizontally and vertically.

The entire transmitter assembly 30 is encased in a weather proof housing 37 of bakelite or the like and fixed to the mounting plate 12. An opening 38 covered by a window 39 is provided at one end of the housing for the light beam B to project through. The window 39 is of a transparent material such as glass or clear plastic and is fixed at the inside of the housing. A lens 52 fixed between the window and the light source 31 focuses the light beam emitted from the light source.

The receiver 40 is positioned at the opposite side of the base plate 12 to detect the presence (or absence) of the light beam emitted from the transmitter. The sensor is enclosed in a weather-tight housing 41, similar in construction to the housing previously discussed in connection with the transmitter 30. An opening 42 is provided at one end thereof having a suitable window 43 therein to admit the projected light beam B. A light beam sensor 44 such as a photocell, is positioned within the housing and arranged to detect the presence of the light beam B. A heating element 82, as for example a nichrome wire coil, may be positioned between the window 43 and the sensor 44 to prevent the formation of condensation as will be more fully described hereinafter. Upon interruption of the light beam B by the snow blocking the apertures 23, 25 or 27 in the barrier members, a signal is provided to produce an audible alarm or other indication at a remote location to thereby indicate to the operator that the level of snow has reached or exceeded the predetermined level.

A mounting bracket or flange 50 (FIG. 2) having a downwardly extending tubular mounting post is preferably provided on the lower surface of the base plate 12 for conveniently mounting the entire assembly. The assembly is preferably mounted in a clear exposed area such that precipitation may fall thereon without obstruction by trees, buildings and the like.

Figure 3:
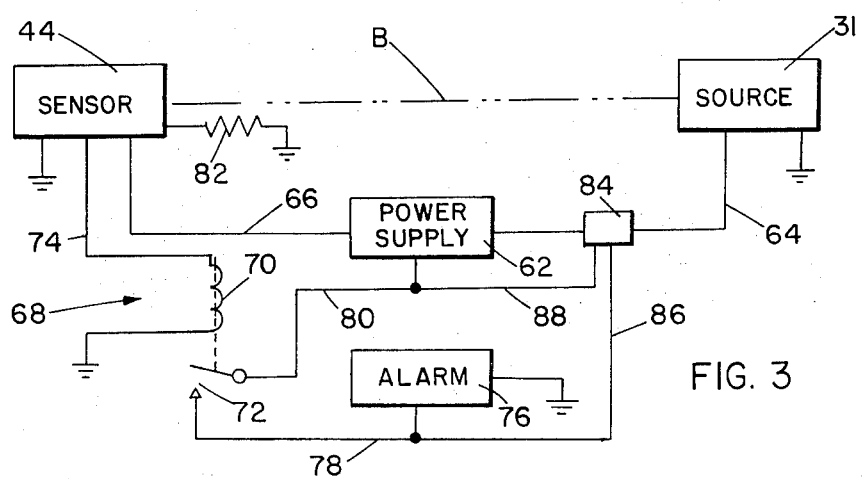
FIG. 3 is a schematic block diagram illustrating an electrical system to be utilized in the present invention.

The electrical circuit utilized in the practice of this invention may be of a basically conventional nature and includes a relay or other switching means normally held in a first switching mode in response to impingement of the light beam on the sensor. Upon interruption of the light beam by the level of snow accumulating above the transmission path of the light beam, the interruption causes the relay to switch to a second conduction mode thereby actuating an alarm. A basic block diagram of one such switching circuit is shown in FIG. 3. Since such circuits are generally well known to those skilled in the art, a detailed discussion and description thereof is not believed necessary. Briefly, the circuit includes the aforementioned transmitter or light source 31 and receiver on sensing element 44, each connected to a suitable power source 62. In the preferred embodiment, low voltage DC power is supplied to the transmitter and receiver circuits through suitable electrical wiring 64 and 66. The sensor 44, as previously mentioned, is a photocell or similar light-detecting device which responds to the presence or absence of the projected light beam B. A relay 68 having a coil 70 and a pair of contacts 72 has its coil 70 connected to the sensor 44 by means of wire 74. In its preferred embodiment, the coil is energized through suitable conventional circuitry associated with the sensor to hold the contacts 72 of the relay in an open position. An alarm means 76 which may be either of a visual or audible type is also connected to power supply 62 by means of wires 78 and 80 through the contacts 72 of the relay 68.

When quantities of snow are carried by the wind, this blowing snow can occasionally cause momentary interruption of the light beam, particularly if the sensor has been set for a very low threshold, i.e., for extreme sensitivity, thereby causing the alarm to oscillate between an off and on position. Since it is desirable to sense only a complete interruption of the light beam as by fallen or drifted snow substantially blocking the apertures in the accumulator 20, a current-limiting circuit may, if desired, be provided to decrease the sensitivity of the apparatus. In one embodiment of the invention, this is accomplished by reducing the light output of the transmitter by introducing a current-limiting means such as a resistor in series with line 64 connecting the power supply 62 to the light source 31. To accomplish this, a current-limiting switch 84 is shown connected in line 64 and may be of conventional construction well-known to those skilled in the art. One such switch of this nature need only include a latching relay (not specifically shown) operable in response to closing of the contacts 72 of relay 68, i.e., closing of the contacts 72 may be used to provide a signal through line 86 to the current-limiting means 84 to connect a current-limiting component in series with light source 31 to reduce the power supplied to, and thereby reduce the output intensity of, the light source. Suitable holding circuit 14 may also be included in the current-limiting means 84 connected via line 88 to the power supply to maintain the current-limiting means in series after initial switching. Suitable manual switching means (not shown) may also be provided to selectively switch the current-limiting means 84 into or out of circuit with the line 64 and the source 31. Other arrangements for decreasing the sensitivity of the apparatus will be readily apparent to those skilled in the art.

It should be pointed out that the circuitry associated with the sensor 44 may (and preferably does) include means such as a manually variable resistance for adjusting the light-responsive characteristics of the sensor 44, to allow the user to vary the threshold at which the alarm will be triggered, to satisfy particular requirements. That is some users may want extreme sensitivity and low threshold, so that they are forwarned at the earliest possible time that snow is in the air, while others may wish to have the alarm operate only under very heavy or dense snow conditions. In this respect, it should also be pointed out that it is certainly within the concept of the invention to change the relative height of the apertures in the barriers and of the light beam with respect to the level of the base plate, to vary the height at which collected snow about the apertures causes a triggering of the alarm. This can be accomplished by merely providing spacing means of different heights for positioning upon the base plate under the barriers and the sensor on receiver housings, to raise the level of the latter components; of course, it would also be entirely feasible to mount such components independently of the platform or base and provide a mechanical or other position-adjustment mechanism therebetween.

To prevent condensation from forming on the window 43 associated with the receiver section 40, a heating element 82 may be positioned adjacent the window 43 within the housing. The heating element 82 may simply comprise a small length or coil of Nichrome or like "toaster wire;" to produce a small amount of heat near the window 43 and thereby prevent the formation of frost, ice or like condensation on the windows.

OPERATION

In use, the apparatus is placed in an open, exposed area by fixing the mounting flange to a suitable mounting post, pole, or the like. The light source is energized and adjusted to project the beam of light B through the apertures 23, 25, and 27 in the barrier members so that the light impinges on the photosensor 44. The alarm remains in an "off" position so long as the beam continues to impinge on the photosensor 44 because the circuitry associated therewith keeps the relay coil 70 energized, holding the relay contacts 72 in an open condition. When snow, sleet, hail or other precipitation begins to fall, it accumulates on the insulating material 29 within the accumulator area 20. The accumulator area 20 is preferably divided into a plurality of accumulating zones or sections labeled C, D, E, and F, each defining an area of intersection between two angularly disposed parts of the barrier members. As snowfall or other precipitation continues to gradually pile up in all or any one of the accumulating zones, it eventually covers at least one of the apertures 23, 25, or 27 in the barrier members. When any one of the apertures is covered, the light beam is interrupted, degenerizing the coil 70 of relay 68 thereby closing the contacts 72. This in turn applies power from the power supply through wire 80, contacts 72, and wire 78 to thereby actuate the alarm 76.

The barrier members are positioned in a somewhat cruciform pattern such that the openings therein are positioned angularly with respect to the axis of the light beam. Through extensive experimentation, it has been determined that the light to moderate breezes and wind usually associated with a light, direct, snowfall (as contrasted to a blizzard) will not adversely affect the sensitivity of the instrument. The particular arrangement of the barrier members prevents the snow from covering the openings until a generally even level of snow is deposited in at least one of the sections C, D, E, or F, of the accumulator as the light breezes, regardless of their prevailing direction, will be directed along the barriers and either dissipated or blow the snow through the opening. If, for example, the breeze is directed from the top of the drawing as illustrated in FIG. 1, that portion of the barriers 22 and 26 defining area C will prevent the snow from blowing out of this area. Similarly, a breeze blowing from the opposite direction, i.e., from the bottom of FIG. 1, will cause the snow to accumulate in area E. Actually, the wind may be directed from virtually any orientation about the apparatus and at least one of the defined areas C, D, E, or F will remain unaffected by the wind. The wind however will blow the snow through the openings keeping them clear until snow has accumulated in at least one area to interrupt the light beam.

The barrier members also serve to detect drifting snow upon the occurance of extremely strong winds which cause the snow to drift into areas previously cleared, even in the absence of new snowfall. The barrier members serve to duplicate or simulate the environmental areas about which snow tends to drift. As the strong winds carrying drifting snow tend to move about and direct their force at the surfaces of the accumulator area 20, snow will accumulate and pile up or drift adjacent the barrier members. While much of the accumulator may be relatively snow-free, the drifted snow against at least one of the barriers will eventually cover at least one of the openings, interrupting the light beam to thereby activate the alarm.

It has also been determined through extensive observation that these artificially-created miniscule snow drifts are representative of the drifting snow in an environmental area subjected to the same winds.

It may therefore be seen that the present invention provides a relatively simple apparatus for detecting the accumulation of snow under given environmental conditions. The apparatus is extremely simple in construction and in its operation thereby rendering it well within the economic reach of the independent snow removal operator. It is completely reliable, thereby eliminating this necessity of the operator to constantly monitor changing weather conditions as he can rest assured that upon the occurence of snow fall or drifting snow above predetermined levels that an alarm or other indication will be given.

While a preferred embodiment of the invention has been illustrated and described it will be recognized that other embodiments and modifications of this invention incorporating the teachings hereof may readily be made in the light of this disclosure. Therefore all modifications employing the principles of this invention are considered as included in the appended claims unless these claims by their language expressly state otherwise.

The embodiments of the invention in which an exclusive property or privilege is claimed are defined as follows:

1. A snowfall level detector comprising: a transmitter adapted to project a beam of electromagnetic radiation along a path at a predetermined level above a reference plane; a receiver positioned along said predetermined path and adapted to detect said beam of electromagnetic radiation, said receiver having means associated therewith to provide a signal upon interruption of said beam; and upstanding wall means for catching and trapping falling and drifting snow in the space generally between said transmitter and said receiver and in the path of said beam, said means including at least one member having an opening therein at said predetermined level to allow passage of said beam therethrough whereby the accumulation of snow above said predetermined level interrupts said light beam thereby causing said sensor to provide said signal.

2. The apparatus as defined in claim 1, wherein said transmitter and said receiver are a light beam projector and a light-responsive electrical device, respectively.

3. The apparatus as defined in claim 1, wherein said receiver and said transmitter are positioned on a generally flat planar mounting plate, said mounting plate providing a reference plane for said beam.

4. The apparatus as defined in claim 3, wherein said mounting plate has a heat-insulating carpet means on at least portions thereof.

5. The apparatus as defined in claim 3 and further including: housing means for generally enclosing said transmitter and said receiver; window means in said housing for allowing the passage of said light beam from said transmitter to said receiver; and heating means for at least partially preventing the formation of condensation over said window means.

6. The apparatus as defined in claim 5, wherein said heating means is positioned in said housing adjacent said window.

7. The apparatus as defined in claim 3, wherein said wall means comprise a plurality of upwardly extending barrier members arranged on said mounting plate in a generally cruciform pattern with respect to said path.

8. The apparatus as defined in claim 7, wherein said barrier means define an opening about the point of intersection of said members, at the intersecting portion of said cruciform pattern.

9. The apparatus as defined in claim 2, and further including means for varying the intensity of said light beam to thereby vary the sensitivity of said detector.

10. The apparatus as defined in claim 9, wherein said light beam projector is adapted for connection to a source of power and said means for varying the intensity of said beam is selectively connectable in series circuit between said projector and said source.

11. An apparatus for detecting snowfall above a predetermined level comprising: a base plate; means for transmitting a beam of electromagnetic radiation at a predetermined level above a generally parallel to said base plate; means for detecting said beam of electromagnetic radiation; alarm means connected to said detecting means, said alarm means responsive to interruption of said beam; accumulating means positioned between said transmitting means and said detecting means, said accumulating means including barrier members having open spaces therein to permit the passage of said beam therethrough from said transmitting means to said sensing means; said barrier means cooperatively forming wind deflection means to entrap wind-driven snow to thereby simulate snow drifting environmental conditions wherein said drifting snow obscures said apertures thereby interrupting said beam and actuating said alarm.

12. A method of detecting the level of snowfall above a predetermined level comprising: transmitting a beam of electromagnetic radiation at a predetermined level above a reference place; detecting said beam of electromagnetic energy; using upstanding wall means to trap falling and wind-driven snow and to accumulate the same in an area through which said beam of electromagnetic radiation is transmitted; and sensing the interruption of said beam to thereby indicate that said falling snow has exceeded a predetermined level.

13. A snowfall level detector comprising: means defining a snowfall accumulator; a light beam transmitter means positioned to transmit a beam of light across said accumulator; a receiver positioned to detect said beam of light and to provide a signal upon interruption of said beam; and signal responsive means connected to said receiver to provide an indication upon the interruption of said light beam said means defining said accumulator comprising a plurality of vertical upstanding baffle members having apertures therein positioned between said transmitter and said receiver, said light beam passing through said apertures from said transmitter to said receiver; said baffle members defining a plurality of mutually independent areas in which snow may accumulate, each of said areas including a portion therein through which said beam is projected, whereby accumulation of snow is any one of said plurality of areas interrupts said light beam thereby activating said alarm.

14. The apparatus as defined in claim 13, including a carpet of heat-insulating material disposed as a floor in said mutually independent areas.

* * * * *